Aug. 15, 1933.  M. O. REEVES  1,923,041
DISTANT CONTROL FOR SPEED VARYING DEVICES
Original Filed March 15, 1924   2 Sheets-Sheet 1
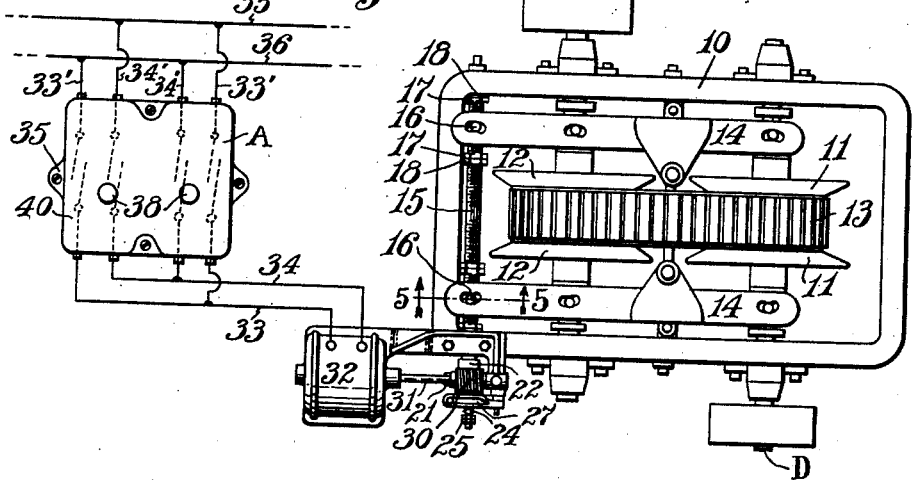
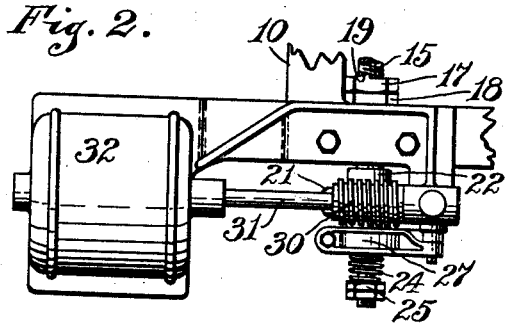
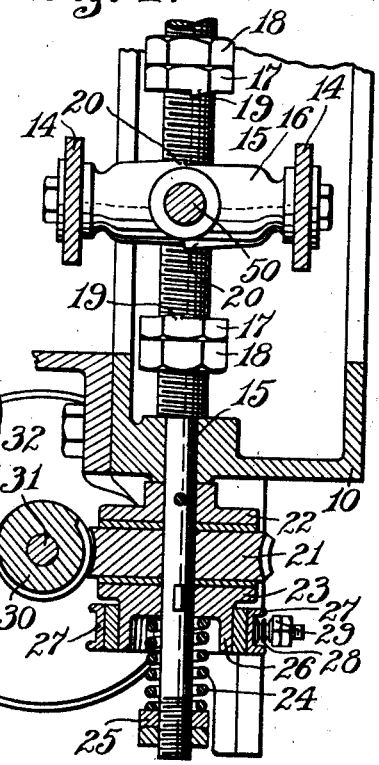
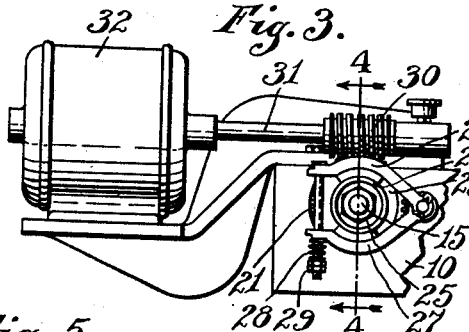
INVENTOR.
Milton O. Reeves, deceased,
by Paul B. Reeves, administrator,
Hood + Hahn.
ATTORNEYS

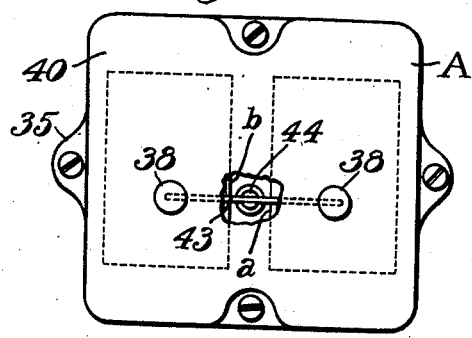
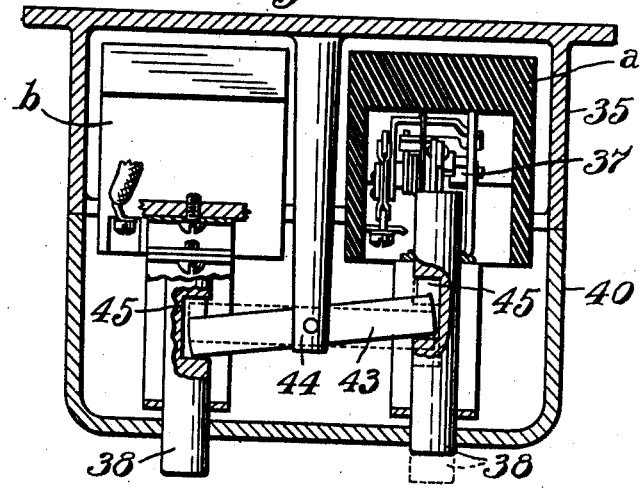
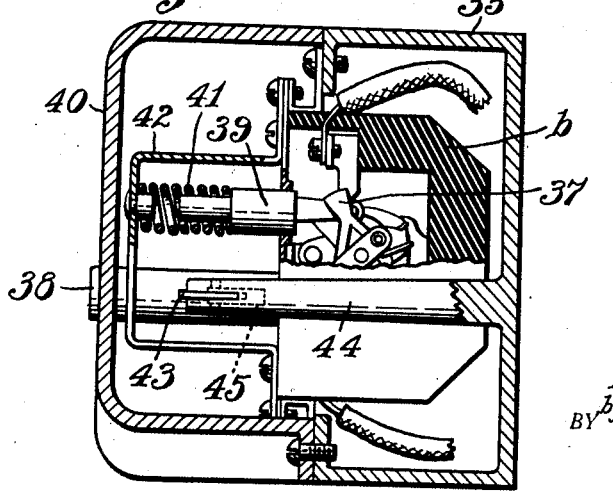

Patented Aug. 15, 1933

1,923,041

UNITED STATES PATENT OFFICE 1,923,041

DISTANT CONTROL FOR SPEED VARYING DEVICES

Milton O. Reeves, deceased, Columbus, Ind., by Paul B. Reeves, Columbus, Ind., administrator, assignor to Reeves Pulley Company, Columbus, Ind., a Corporation of Indiana Refiled for abandoned application Serial No. 699,590, March 15, 1924. This application January 17, 1927. Serial No. 161,699

5 Claims. (Cl. 64—8)

The object of the present invention is to provide means by which a controlling shaft, movable in opposite directions, may be mechanically manipulated within desired limits without producing a jamming of the parts. Specifically the object of the invention is to provide a mechanism by means of which the shifting levers of a speed varying mechanism of the two-pair-cone type may be mechanically shifted under the control of a distant-control element so as to vary the speed of the driven element, without the possibility of injurious jamming which might otherwise result from improper manipulation of the distant-control element. The present application is a re-file of the application abandoned, application Serial Number 699,590 filed March 15, 1924.

The accompanying drawings illustrate the invention.

Fig. 1 is a plan of the improved apparatus;

Fig. 2 a fragmentary plan, on a larger scale, of the reversing motor and adjacent parts;

Fig. 3 a side elevation of the parts shown in Fig. 2;

Fig. 4 a fragmentary section, on a larger scale, on line 4, 4 of Fig. 3;

Fig. 5 a fragmentary section on line 5—5 of Fig. 1, on the scale of Fig. 2;

Fig. 6 a front elevation of the distant-control switch;

Fig. 7 a section through the controlling switch, and

Fig. 8 a section at right angles to the plane of Fig. 7.

In the drawings, 10 indicates the frame of the "Reeves" speed-varying transmission which is well-known in the market, said transmission comprising two pairs of friction cones 11, 11 and 12, 12 connected by a belt 13; a pair of levers 14, 14, which engage the friction cones to shift them toward and from each other; and a threaded controlling shaft 15 carrying nuts 16, 16 which engage the levers 14, 14 to swing the same in opposite directions about their pivots.

Thus far, the construction is common and well-known.

The shaft 15 is oppositely threaded at its ends, where the two nuts 16, 16 are mounted and upon each of these threaded portions, at each side of each nut 16 is an adjustable stop 17, to limit the possible movement of the associated nut 16, said stop being conveniently in the form of a nut mounted upon the threaded portion of the shaft and held in adjusted position by a check-nut 18. Each stop 17 is provided on its inner face with a radial shoulder 19 adapted to be engaged by a shoulder 20 on nut 16.

Journaled upon the extended end of shaft 15 is a worm gear 21 which lies between two friction discs 22 and 23, disc 22 being secured to shaft 15 and disc 23 being splined thereon and urged into frictional engagement with gear 21 by means of a spring 24 having an adjustable abutment 25.

Disc 23 is formed with a friction drum 26 which is engaged by a pair of brake arms 27, 27 which are yieldingly urged into engagement with the drum by a spring 28 acting upon the two brake arms 27, 27, its tension being adjustable by means of an adjustable abutment 29.

Meshing with worm gear 21 is a worm 30 carried by a shaft 31 of a small reversing electric motor 32 supplied with current through wires 33 and 34 from a supply line 35—36 through a special switch A.

The special switch A comprises the main casing 35 in which are mounted two snapswitch blocks a, b, of ordinary construction and embodying snapswitch mechanism 37, each controlled by a circuit-making plunger 38 and a circuit-breaking plunger 39 each circuit-making plunger being projected through the casing cover 40 and each circuit-breaking plunger being normally urged to circuit-breaking position by a spring 41 abutting against the yoke 42. Simultaneous manipulation of the two circuit-making plungers 38 is prevented by an interlocking lever 43 pivoted upon post 44 and extended into slots 45 of the plungers 38, the arrangement being such that either plunger 38 may be freely moved to circuit-making position, whereupon a similar movement of the other plunger 38 is prevented so long as the first plunger 38 is in circuit-making position, but such that the two plungers 38 will not be simultaneously moved to circuit-making position. The supply wires 35 and 36 are connected to wires 33 and 34 by wires 33' and 34' in such manner that the switch a will deliver current to the motor 32 in such manner as to cause rotation in one direction while switch b will deliver current to the motor in such manner as to cause rotation in the opposite direction.

In operation shaft 15 and motor 32 are normally stationary and when a change of speed of the driven shaft D of the speed-varying mechanism is desired, the operator will push the appropriate plunger 38 inwardly so as to cause rotation of motor 32 and thus rotate shaft 15 to cause an appropriate positioning of cones 11, 11 and 12, 12, the movement of shaft 15 stopping immediately upon the release of the manipulated plunger 38 owing to the prompt breaking of the circuit by the action of spring 41 and the effect of the brake shoes 27.

As shaft 15 is rotated the nuts 16 will approach one or the other of the flanking stops 17 and whenever said stops are contacted by the nut 16 the consequent resistance offered to the rotation of worm wheel 21 would, in due course, result in a stoppage of rotation of the shaft 15 even though the shoulders 19 and 20 were not provided but the probabilities are that there would be such a jamming of the nut 16 against the stops as to either cause injury or prevent a reversal of rotation of shaft 15. With the construction shown, however, whenever nut 16 closely approaches a stop 17, the next to the last desired turn of the shaft 15 will bring the point of shoulder 19 to a position where it will just clear the point of the adjacent shoulder 20 and the final turn will then bring shoulder 19 against shoulder 20 so that rotation of shaft 15 in that direction is brought to a definite non-jamming stop which will leave the shaft 15 free to be readily rotated in the opposite direction when the next change of speed of the speed mechanism is desired.

As there is a considerable tendency toward rotation of the nut 16 between the two elements (Fig. 5) of lever 14, each nut is provided with an extension or arm 50 which, at its outer end is provided with a cross-arm 51 which lies between and engages the two portions of the lever 14 and thus prevents any rotation of nut 16 with shaft 15.

It will be readily understood that any desired number of controlling switches A, located at desired points, may be arranged in parallel between the supply line and the motor.

What is claimed is:

1. In a speed varying mechanism comprising two pairs of friction cones, a connecting belt, two controlling levers acting upon said pairs of cones to variably position the same relative to the belt, a threaded shaft, and a pair of nuts carried by said shaft and engaging said levers to variably position the same, a friction drive for rotating said threaded shaft, and stops for preventing the movement of the threaded shaft to drive said levers beyond working positions of the cones, said stops engaging said nuts to stop rotating movement of said shaft before frictional contact of said nuts with said stops is effected.

2. In a speed varying mechanism comprising two pairs of friction cones, a connecting belt, two controlling levers acting upon said pairs of cones to variably position the same relative to the belt, a threaded shaft, and a pair of nuts carried by said shaft and engaging said levers to variably position the same, a friction means for rotating said threaded shaft, and stops for limiting the movement of the shaft by the friction drive, said stops being mounted upon the shaft and having projections adapted to engage the nuts in direct relative-rotation-limiting relationship.

3. In a speed varying mechanism comprising two pairs of friction cones, a connecting belt, two controlling levers acting upon said pairs of cones to variably position the same relative to the belt, a threaded shaft, and a pair of nuts carried by said shaft and engaging said levers to variably position the same, a gear journaled upon said shaft, a friction element carried by the shaft and engaging the gear, means for yieldingly urging the friction element and gear together, a brake acting upon said shaft, means by which said gear may be rotated, stops for limiting the movement of the shaft by the friction drive, a reversing electric motor connected with said gear, and a reversing switch in circuit with said motor.

4. A speed varying mechanism comprising two pairs of friction cones, a connecting belt, two controlling levers acting upon said pairs of cones to variably position the same relative to the belt, a threaded shaft, and a pair of nuts carried by said shaft and engaging said levers to variably position the same, a gear journaled upon said shaft, a friction element carried by the shaft and engaging the gear, means for yieldingly urging the friction element and gear together, a brake acting upon said shaft, means by which said gear may be rotated, and stops mounted upon the shaft and having projections adapted to engage the nuts to stop rotation of said shaft before frictional engagement between said nuts and stops is effected.

5. The combination of a speed varying mechanism comprising two pairs of friction cones, a connecting belt, two controlling levers acting upon said pair of cones, to variably position the same relative to the belt, a threaded shaft, a pair of nuts carried by said shaft and engaging said levers to variably position same, stops mounted upon the shaft for limiting the movement of the levers under the action of the shaft, inter-engaging, cooperating elements carried by the stops and nuts for directly limiting rotation of the shaft, a frictional driving element for the shaft, a reversing electric motor connected with said driving element, and a reversing switch in circuit with said motor.

PAUL B. REEVES,
*Administrator of the estate of Milton O. Reeves.*